July 5, 1932.   D. R. YARNALL   1,865,604

CONTROL FOR VALVE TURNING AND OTHER OPERATIONS

Filed May 14, 1927   8 Sheets-Sheet 1

Witness:
Walter Chiswell

Inventor
David Robert Yarnall
by
Wm Steell Jackson
Attorney

July 5, 1932.     D. R. YARNALL     1,865,604
CONTROL FOR VALVE TURNING AND OTHER OPERATIONS
Filed May 14, 1927      8 Sheets-Sheet 2

Inventor
David Robert Yarnall
by ______
Attorney

Witness:
______

Patented July 5, 1932

1,865,604

UNITED STATES PATENT OFFICE

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA

CONTROL FOR VALVE TURNING AND OTHER OPERATIONS

Application filed May 14, 1927. Serial No. 191,517.

My invention relates to a device and method intended to perform or control a succession of movements of a valve, a switch or other operating or directing mechanism.

A purpose of my invention is automatically to control a succession of movements, to any predetermined extent and, where desired, to stop the operation at the end of the series.

A further purpose is to operate a valve, switch or other control automatically through a series of opening and closing movements constituting a cycle and to stop it at the end of the cycle.

A further purpose is to operate a valve automatically and to interrupt the operation at intervals by a predetermined time element preferably turning with the valve.

A further purpose is to rotate a valve intermittently in the same direction to successive open and closed positions and to control the distance which the valve moves at each operation by rotatable mechanism connected with the rotating valve turning mechanism.

A further purpose is to control the time of successive valve-throwing operations up to a final stoppage of movement.

A further purpose is to provide for operation of a press or other apparatus using one or more than one speed or pressure of operation, applying the operating force or forces for a predetermined time, or for a succession of time intervals of predetermined length and cutting it or them off at the ends of the intervals.

A further purpose is to apply different hydraulic pressures successively for predetermined lengths of time and in any prearranged order, and to positively control the limits of application.

Further purposes will appear in the specification and in the claims.

My invention relates both to methods of operation and to mechanism disclosed capable of carrying out said methods.

I illustrate my invention by two only among the forms in which it may be applied, using these to illustrate the fact that the invention is not limited to one structure nor one type of structure or operation but is broad in its practice and general in its application.

All of the figures are intended to be largely diagrammatic.

Figure 3 is a side elevation of part of a structure of Figure 1.

In the drawings similar numerals indicate like parts.

In some operations it is quite desirable to apply some operating force or to maintain some pressure upon a machine or tool and to vary it and withdraw it at prearranged time intervals. Though my invention can be used and illustrated by other forces than hydraulic and in other uses than in press work application to the hydraulic operation of a press to apply different pressures at different times, forms so good an application that I have shown it here.

In die press work upon phenol derivatives, for example, a die containing material to be pressed and heat-treated is placed within the press and the greater part of the movement of the press is effected by a relatively low hydraulic pressure, after which a much higher hydraulic pressure is applied for a predetermined time during which the material within the die is being heat treated. The high pressure in the press cylinder is subsequently exhausted, with or without an intermediate neutral position in which neutral position the high pressure supply may be cut off from the press without connecting the press cylinder with the exhaust.

Figure 1:
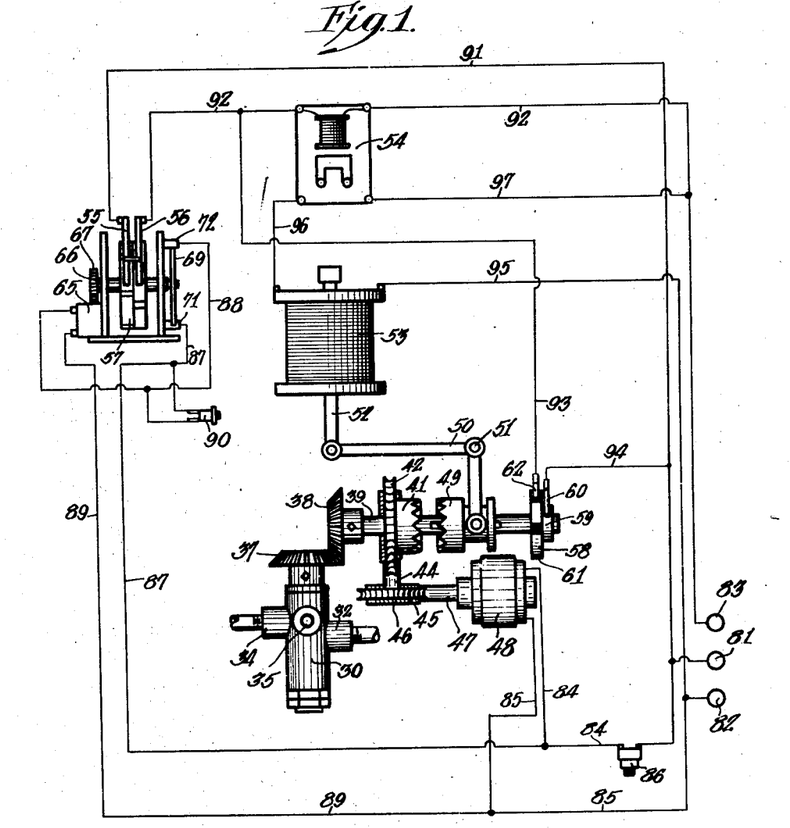
Figure 1 is a diagrammatic top plan view showing one form of my invention.

My invention, as illustrated, comprises operating mechanism for the valve, shown in Figure 1 as continuously movable, time-control mechanism and connections between the two whereby the valve is reliably turned to successive exact positions desired throughout the sequence for the intended operation.

I preferably interrupt the operation after each sequence so as to permit, in the example, substitution of a new charge of material to be operated upon in the press.

Figures 2, 4, 5, 6, 7:
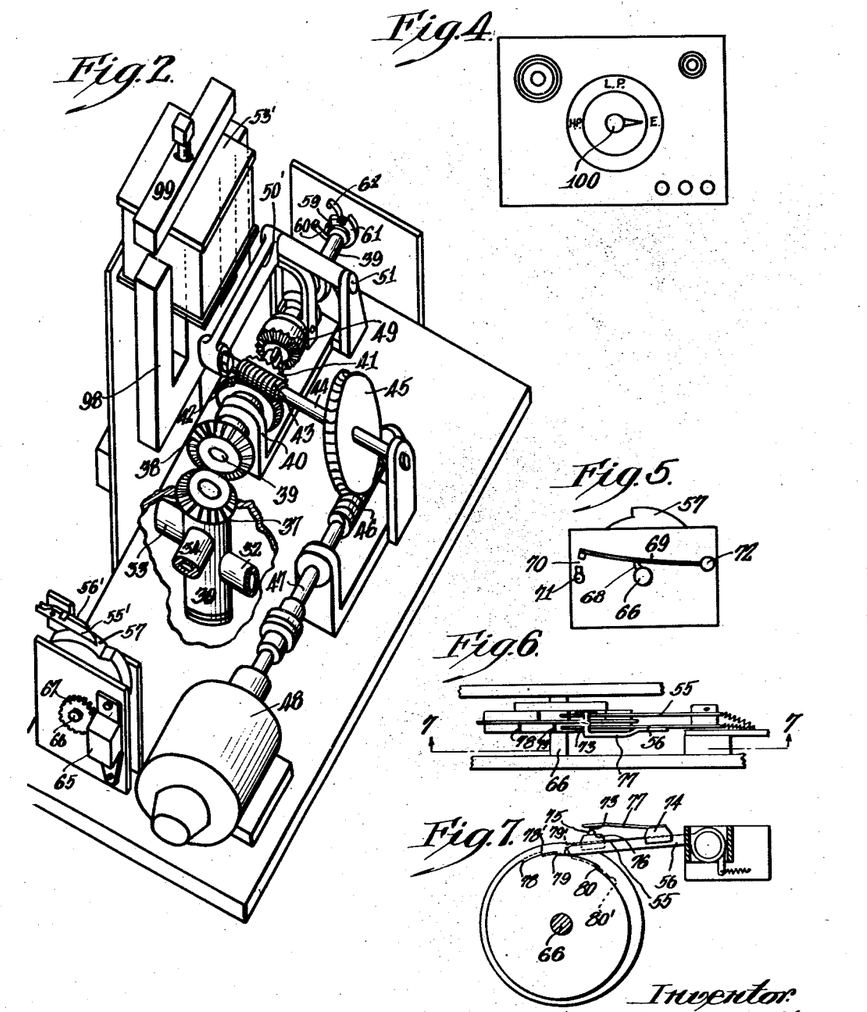
Figure 2 is a fragmentary perspective, of which parts are sectioned, showing a modified structure of the character seen in Figure 1.
Figure 4 is a fragmentary end elevation of a part of Figure 2.
Figure 5 is an end elevation of a disc seen in Figure 1.
Figures 6 and 7 are a fragmentary top plan view and section thereof upon line 7—7, showing a portion of Figure 1.
Figure 5:
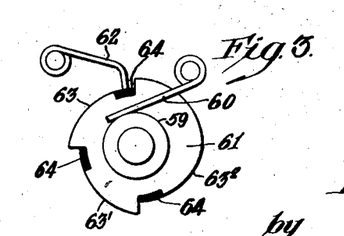

Describing first the electrically controlled and operated form shown best in Figures 1 and 2, but without intending to restrict to electrical or indeed to any particular character of operating force:—

Figures 16, 18:
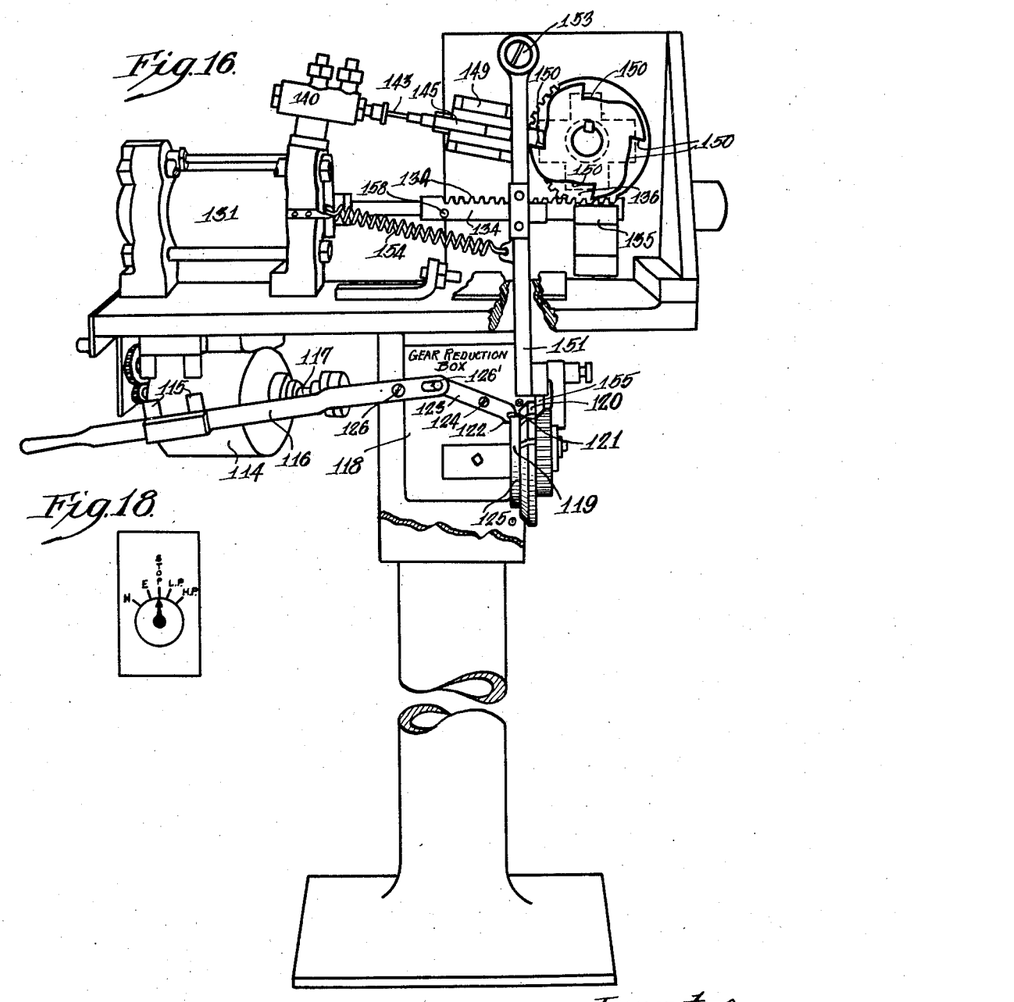
Figures 16 and 17 are fragmentary elevations, partly in section or modified forms of the structure seen in diagram in Figure 15.
Figures 18, 19 and 20 are a top plan view and elevations of different parts of Figure 17.
Figures 17, 19, 20:
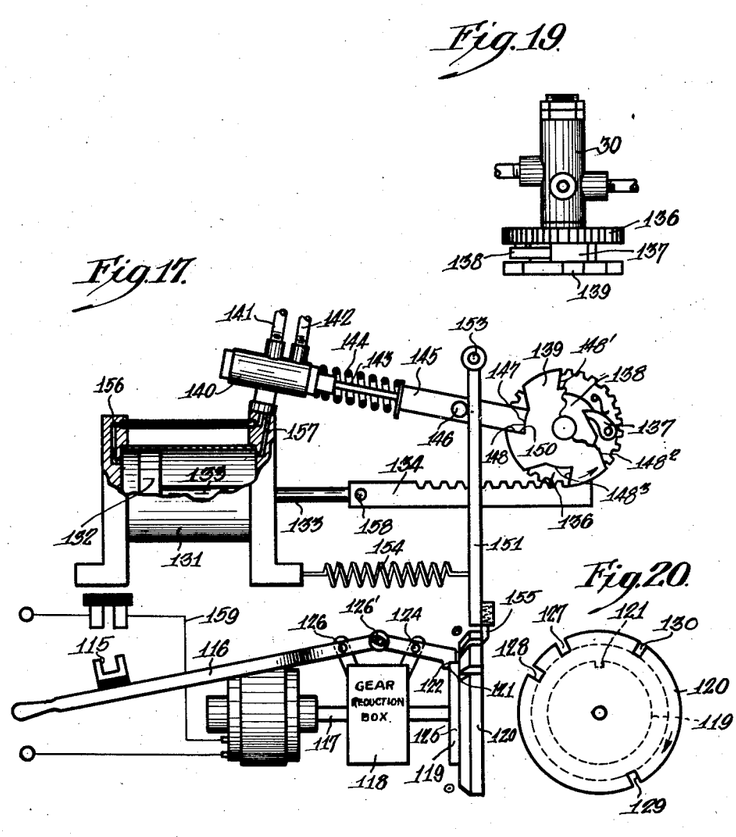

As the immediate purpose of the construction of Figures 1 and 2 and also of Figures 16 and 17 is the operation of a valve according to a predetermined sequence of fluid connections formed thereby, I will describe my invention in connection with such a valve pointing out, however, that other operating or, rather, operation-directing mechanism than a valve may be used where the operating force to be applied is not hydraulic.

The parts shown in Figure 2 are slightly different as shown from the parts in Figure 1. For this reason the same reference characters will be used in both where they are the same and corresponding reference characters "primed" will be used in Figure 2 without further reference to the "primes" where the structure is somewhat different.

Figure 15:
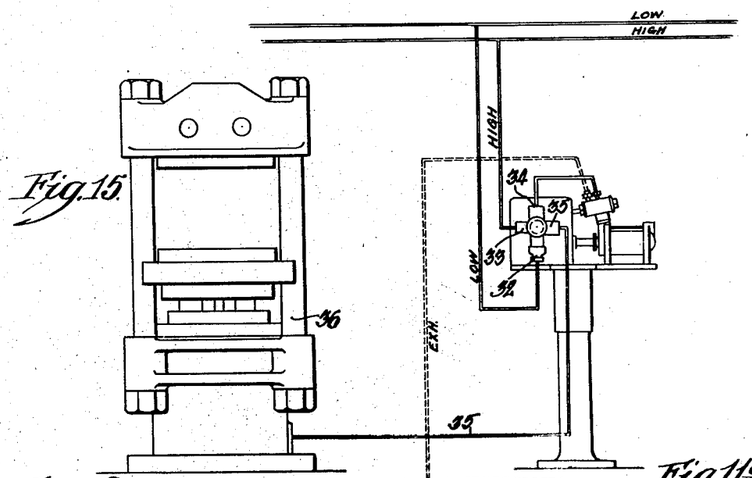
Figure 15 is a diagrammatic view of a second operating mechanism connected with a press.

In the valve 30 shown there are four fluid connections ranged about a plug 31. These connections are, the low pressure connection 32, the high pressure connection 33, the exhaust 34 and the connection 35 to the press 36 (Figure 15).

The plug is connected with a gear 37 meshing with gear 38 upon a shaft 39 in suitable bearings 40 not shown in Figure 1.

The shaft 39 carries a clutch member 41 continuously rotatable about but loose upon it. It is turned through worm gear 42 by worm 43 upon a shaft 44 carrying a worm gear 45. The worm gear 45 is operated by a worm 46 upon shaft 47 rotated by a motor 48.

Splined to the shaft 39 is a clutch member 49 which is slid into and out of engagement with the clutch member 41 by a rocker arm 50 pivoted at 51 and operated by the plunger-controlled rod 52 within a solenoid 53. This mechanism is intended to represent merely a clutch controlled operating mechanism set and released by an electric circuit.

The current for the solenoid is controlled by a relay 54. This relay is normally operated by current passing through fingers 55 and 56 where the circuit is closed by a rotary cam 57 turned at a constant speed, as by an electrically operated clock mechanism of any suitable type.

A very satisfactory mechanism for this purpose is on the market under the name of the Warren telechrone.

The contact making device represented by the cam 57 and the fingers 55 and 56 is in parallel with a contact device at a cam 58 on the shaft 39. After the circuit has been closed by the cam 57 to start rotation of the valve plug the cam 58 on the shaft 39 operating the valve closes the contacts 60 and 62 before the opening of the contacts 55 and 56 at the starting cam 57, the shaft 39 continuing to rotate, until subsequently opened at the contact cam 58.

The particular form of contact cam illustrated at 58 comprises a continuous ring and brush contact 59, 60 for one side of the circuit in electrical connection with a cam disc 61 engaged by finger 62 connected with the other side of the circuit. The finger 62 makes contact successively with surfaces 63, 63', 63² of corresponding number with the number of positions at which the valve plug is to be stopped and between these contacts engages with insulated portions 64 at which the circuit through fingers 60, 62 is interrupted. The surfaces 63, 63', etc. are illustrated as of cam shape with a view to giving sharper definition to the limit of contact when the finger 62 drops off of the edge of the cam.

The clock 65 as shown rotates a shaft 66 through gearing of which gear 67 only shows in the drawing. The cam 57 is supported upon the shaft 66 which carries also a projection 68 by which arm 69 is moved to open at 70 a circuit through terminals 71 and 72, (Fig. 5).

The cam 57 is intended to represent any contact controlling device by which at predetermined time intervals contact may be made. In the illustration I have shown the cam as having staggered cam surfaces operating at different times upon the two fingers 55 and 56 so as to close a circuit by their movement and to keep it closed long enough so that shaft 39 is turned to make contact between fingers 60 and 62. Because I have preferred not to pass the current directly through the fingers themselves I have insulated the contacts 73 at 74 and 75 at 76 from the respective fingers 56 and 55 and have transversely turned the contact 73 from an arm 77 by which it is intermediately carried, thus locating the contact 73 directly over contact 75. As will be seen lowering of finger 56 before finger 55 is lowered or lifting the finger 55 before finger 56 is lifted will close the contacts 73 and 75 and they will remain closed until the fingers have been allowed to move to separate the contacts. In the illustration I have lowered finger 56 to effect the engagement between the contacts and have exaggerated the spacing between when finger 55 is allowed to drop by meantime lifting finger 56. This operation of the fingers is effected by a plurality of cam faces 78, 79, 80 and 78', 79', 80' upon the cam 57 operating, one set upon the finger 55 and the other upon the finger 56. This is merely one form of contact making device effective at predetermined intervals to make and for a time to retain contact engagement between the conductors connected with these contacts. Because the cam operates at a uniform rate of speed the spacing of the cams along the cam surfaces represents time intervals between successive closings of these contacts and will be designed to correspond with successive valve actuations in accordance with the requirements of the particular operation which is being performed.

For convenience in operation I have supplied two different voltages of current; for example, 110 volts across from binding post 81 to either of posts 82 and 83 and 220 volts across from post 82 to post 83.

The electric circuits for supply of the various pieces of apparatus in Figure 1 are as follows:—Motor 48 is shown as connected across from binding post 81 to binding post 82 by conductors 84 and 85. Within this circuit is located a switch 86 controlling the operation of the motor and of the time clock. The clock 65 is connected with binding posts 81 and 82 by conductors 87, 88 and 89 connected with conductors 84 and 85. Within this circuit is located the switch member shown in Figure 5 which is adapted to open the circuit at 70 in certain positions of shaft 66. The switch opening at 70 is bridged by a hand-operated switch 90 by which after the time clock circuit has been opened at a part of its operation corresponding with position of Figure 5, the circuit can be closed to start the clock again for another turn of the shaft and of cam 57.

The relay circuit is connected across binding posts 81 and 83 through conductors 91 and 92. This circuit is adapted to be closed by closing of contacts 73 and 75 and is opened by the opening of these contacts. The contacts 73 and 75 control the starting of the motor. As the length of time of motor operation is not well suited for exact positioning of the valve plug in its several points of fluid connection, the contacts 73 and 75 are closed for a short time only during which connection is made through the wires 93 and 94 at the contact maker 58 and fingers 60 and 62. The contacts 73 and 75 are kept closed long enough for the motor to rotate the shaft 39 part of a turn so that the finger 62 will engage with a conducting part of the surface rather than a non-conducting part, causing the relay circuit to be closed through conductors 93 and 94. Rotation of the shaft 66 subsequently causes the contact through 73 and 75 to be broken.

In the meantime the contact through finger 62 is maintained until rotation of shaft 39 turns contact maker 58 to a position where the finger again engages with insulation upon the surface. This can be determined very exactly to agree with the position of the valve plug since the plug and shaft are geared together.

The current for the solenoid 53 is supplied through conductors 95, 96 and 97 at a voltage of 220, as shown. This current is continuous while the relay is acting, but is cut off when the relay circuit opens.

In operation the switch 86 is turned and current is applied to the motor 48 and to the clock. This latter connection is made through switch 90 if in the position of the parts the switch connections at 70 (Figure 5) be open. The clock causes rotation of the cam 57 closing contacts at intervals corresponding with the number of successive partial turns to be given to the valve. These contact engagements through 73 and 75 energize the relay coil causing current through the solenoid and throwing the clutch to rotate shaft 39 and through it to turn the valve plug. The contact is soon made by finger 62 with the conducting surface of contact maker 58 after which current through contacts 73 and 75 is interrupted. The motor continues to rotate the valve plug until insulation upon the contact maker 58 interrupts the circuit at finger 62. The clutch then releases. The cam formation of the surface with which finger 62 engages ensures a quick break avoiding arcing.

The valve remains in the position to which it has been set for the time required for the predetermined operation (for example, until the low pressure has moved the die of the press against the material to be acted upon).

The second contact cam of the clock-rotated series then causes a second engagement between contacts 73 and 75 followed by a second solenoid operation and clutch engagement with the result that the valve plug rotates through a second step of its movement again closing a circuit through finger 62 to continue the relay circuit after the contacts 73 and 75 have separated, causing rotation of the valve until the finger 62 falls from a second cam surface upon cam 58 to another insulated portion of this cam formed contact maker.

At this point in the example cited the higher pressure supply will be connected to the press cylinder and will remain connected with it during the time elapsing until the time clock operated cam causes a third engagement between contacts 73 and 75 resulting in a third like rotation of the valve plug to a position where in the example given the press is connected to exhaust. In this example there are but three cam positions for connection of contacts 73 and 75 in the time-controlled mechanism and at the end of the third engagement between contact 62 and the device with which it makes engagement, the valve will remain in this exhaust position until reset by hand switch 90, preferably a push-button switch. In the meantime the time-controlled mechanism will continue to rotate, but there will be no more cam surfaces to cause engagement of contacts 73 and 75 and finally the switch at 70 will be opened cutting off the current from the clock.

In Figure 2 slightly different proportions are shown and the solenoid is shown as of slightly different mechanical construction having a closed magnetic circuit provided by a frame 98 and a top bar 99.

The cam 57 is shown as having but one set of cam surfaces and the difference in time providing for dropping of one of the fingers 56′ before the other, 55′ is provided by making the fingers of different length. The relay is not separately shown.

An indicator 100 shows the position at which the valve is set.

Figure 12:
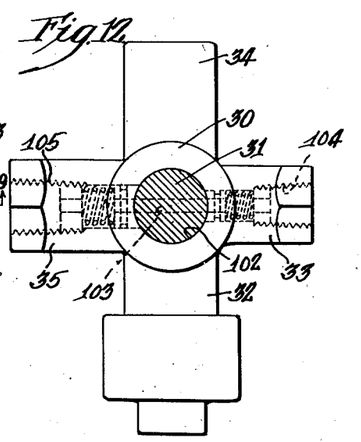
Figure 12 is a section of Figure 11 upon line 12—12.
Figure 13:
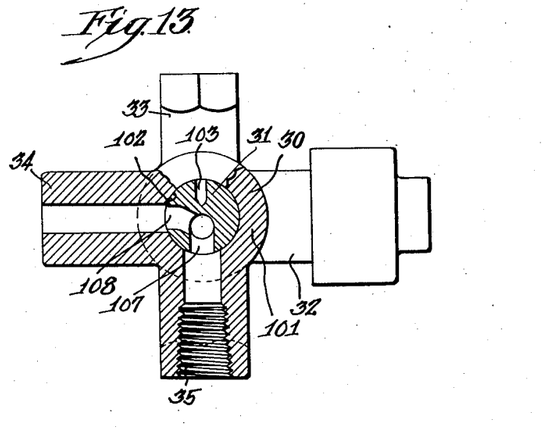
Figures 13 and 13a are a section corresponding to Figure 8 but with the plug in a different position and a diagram of its connections.
Figure 13A:
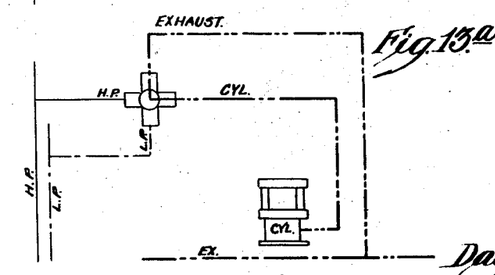

One form of valve is shown, by way of example, in the several positions for connection, namely, low pressure to press or machine (Figures 8 and 9), high pressure to press (Figures 11 and 12), neutral, having high and low pressure and press connections all closed by the walls of the plug (Figure 10), and press or machine to exhaust (Figure 13).

The valve body 101 is centrally bored at 102 for the straight plug 31, which plug is provided with openings as follows:—

The high pressure passage 103 has a rather diagonal direction from an inlet at 104 to an outlet at 105 on the opposite side of the plug and at a distance from it along the axis of the plug.

The low pressure passage 106 has three openings, two, 107 and 108 located at the same part of the length of the plug as the high pressure opening 105. Opening 107 is spaced 90° about the plug from the high pressure outlet and the other, 108 further about the plug 90° from 107 and therefore 180° from the high pressure outlet. The third opening 109 is in line parallel with the axis with opening 108 being spaced from it along the axis to register with the position of the machine connection 35 for the same reason that the inlet of the high pressure passage is spaced from its outlet so as to register with the high pressure connection.

Figures 9, 11:
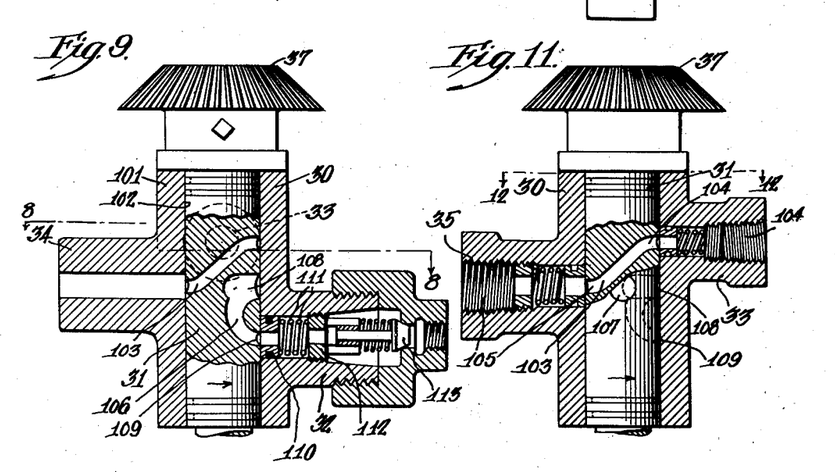
Figures 9 and 10 are sections of Figure 8 taken upon line 9—9 but with the plug in different positions.
Figures 11 and 11a are a section of Figure 8 upon line 11—11 but with the plug in a different position and a diagram of its connections.

The three passages are interconnected as seen best in Figure 11.

This arrangement provides a high pressure inlet at one position along the axis, an opening for machine connection at another position along the axis, directly in line with the high pressure inlet and three intermediate openings, two of them interconnected and connected with the opening for machine connection and the third the high pressure outlet.

Figure 8:
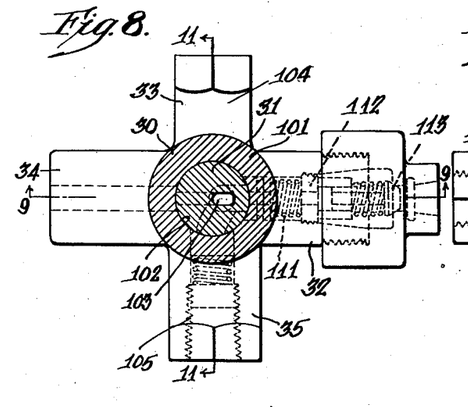
Figures 8 and 8a are a section of Figure 9 on line 8—8 and a diagram of its connections.
Figure 8A:
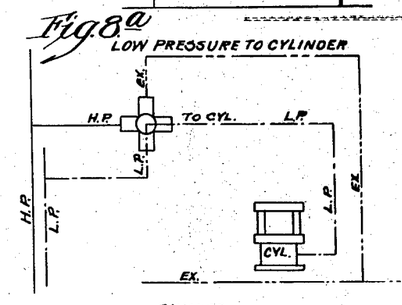

In the position shown in Figures 8 and 9 passage 109 is connected with the low pressure inlet and the passage 107 is connected with the machine or press. The high pressure inlet is closed by the body of the plug. This is the connection for moving the press plunger up to its work.

In the position shown in Figures 11 and 12 the plug has been turned a quarter turn bringing the high pressure passage into communication with the high pressure inlet 33 at one end and with the press or machine connection at the other. All three of the openings 107, 108 and 109 are sealed against the walls of the opening 102 in the valve body and the low pressure inlet is sealed against the valve plug.

Figures 10, 14:
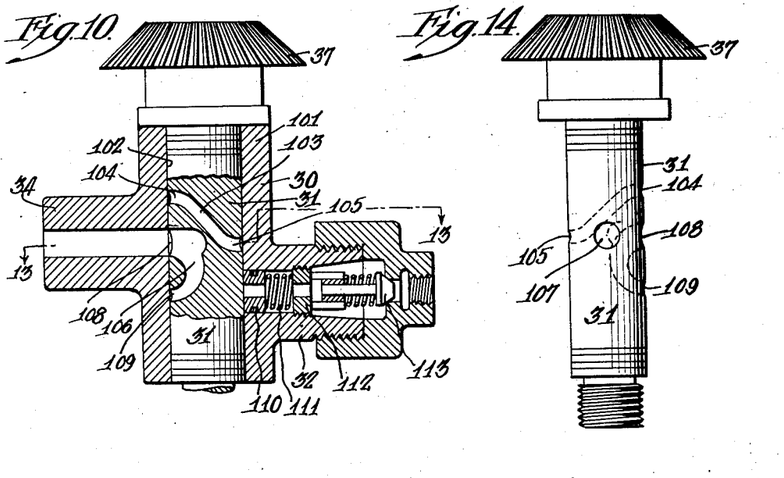
Figure 14 is a side elevation of the valve plug.
Figure 11A:
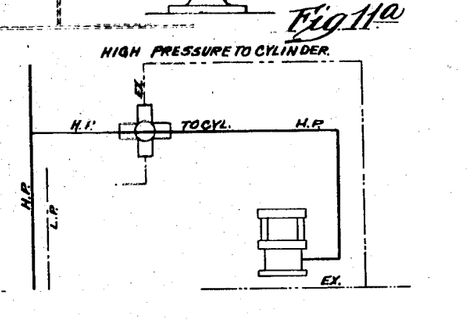

In the position shown in Figure 10 a neutral condition is shown not utilized in the illustration of Figures 1 and 2 but taken advantage of in the illustration of Figures 16 and 17. Here the high pressure passage 103 and the openings 107 and 109 are all sealed against the interior bore 102 of the valve body and opening 108 is connected with exhaust.

In the position shown in Figure 13 the high pressure passage is sealed against the interior of the body and the press or machine is connected to exhaust through openings 109 and 107.

The plug seals against rings 110, pressed by springs 111, abutting threaded sleeves 112 at each of the inlets from low pressure and high pressure and at the outlet to the press or machine as seen in Figures 9 and 11. For the low pressure inlet a check valve 113 is provided to prevent any leakage of high pressure fluid into the low pressure line.

The position in Figure 10 shows the plug turned a quarter turn further in the direction of the arrow from the position of Figure 11 and position in Figure 13 shows a further quarter turn of the plug. Figures 9, 11, 10 and 13 thus represent the four quarters of movement of the plug.

Figures 16 and 17 vary slightly. Where there is a difference in their corresponding parts "primes" will be used without further reference to them.

In this form the motor 114 rotates continuously when the switch 115 upon lever 116 is in closed position. Through shaft 117 and gearing in gear box 118 the shaft rotates connected discs 119 and 120. Of these cycle-limiting disc 119 contains a single notch 121 adapted to receive nose 122 upon a lever 123 pivoted at 124, thus permitting this lever to lock when the notch registers with it but requiring the nose to ride upon the surface 125 of the disc. The nose 122 is held pressed toward the disc by the weight of the switch lever 116 which is pivoted at 126 and is loosely connected at 126' with lever 123.

The disc 120 is notched at a plurality of points shown as 127, 128, 129 and 130, corresponding in timed relation about the circumference of the disc to the times of application of low pressure to the press cylinder, of high pressure to the press cylinder, of neutral connection (in which the high pressure has been cut off but in which the press cylinder has not been connected to exhaust) and of connection of the press cylinder with the exhaust respectively.

A hydraulic operating cylinder 131 is so connected that its piston 132 and piston rod 133 operate a rack 134 suitably guided at 135 to move the rack in engagement with a rack gear 136. The gear is ratcheted to the plug 31 of valve 30 by pawl 137 and ratchet disc 138. A registering disc 139 serving also as a cam is also secured to the plug to rotate with it to limit retraction of the gear and plug with return movement of the rack bar.

Figures 21, 22, 23, 24, 25:
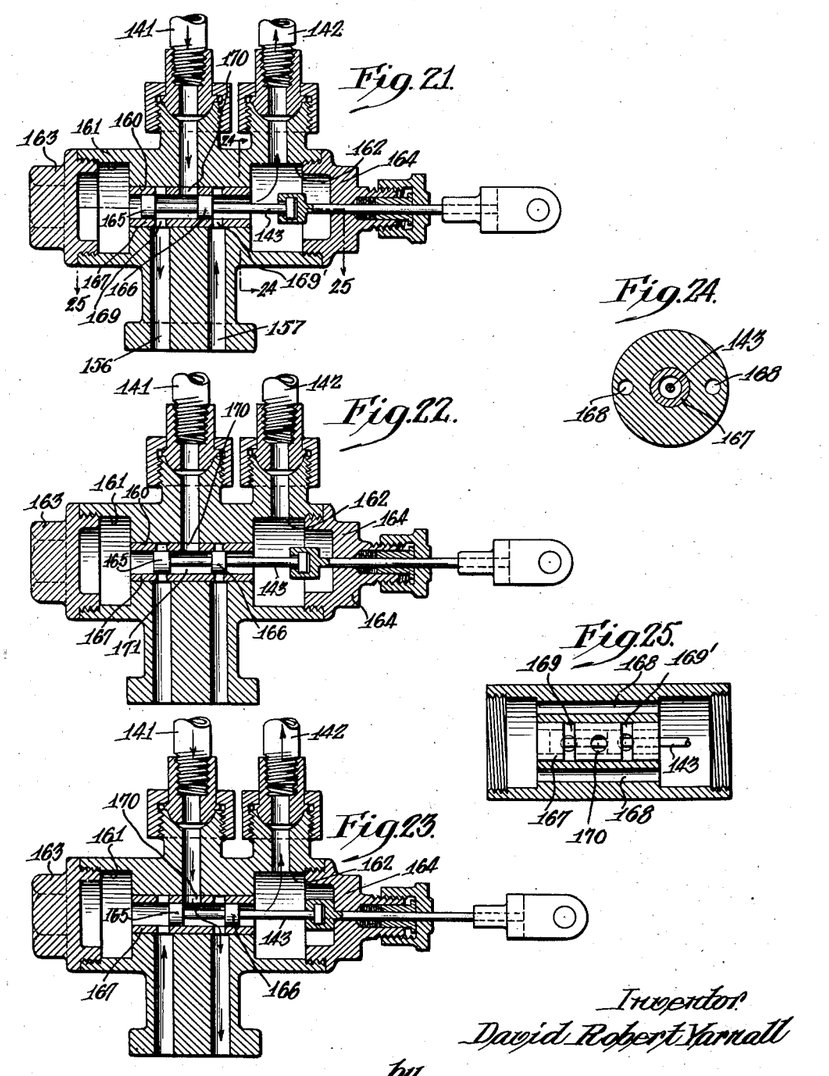
Figures 21, 22 and 23 are longitudinal sections of a valve seen in Figure 18.
Figures 24 and 25 are sections upon line 24—24 and 25—25, respectively of Figure 21.

The valve 140 controls inlet and outlet to opposite ends of the cylinder 131 through the same two pipe connections 141 and 142 according to the position of a valve plunger 143 (Figures 21–23).

The valve plunger is spring-pressed to the right in the figure by spring 144 and carries a bar 145 provided with side pin 146. Its terminal 147 is adapted to engage in any one of the recesses 148, 148', 148², 148³ of the disc. These recesses correspond in number and in spacing about the circumference to the number of intended positions of the valve plug and to the angular positions of the plug when connections are made for the different valve settings intended. In the present case there are four, one more position than in the other form because it is desirable to locate the valve plug openings on the quarters. The positions are four in number, low pressure connection with the press, high pressure connection with the press, neutral position and exhaust position.

The valve plunger bar 145 is shown as guided at 149 to maintain its line of direction and support it against lateral strain, making it possible to use the end of the bar to register the valve positions accurately by successive engagements of disc faces 150 with the side of the end of the bar.

The reversing valve is moved to the left in the figures, against its spring retraction, through engagement of an operating lever 151 with pin 146. This operating lever is pivoted at 153 and is normally resiliently retracted to the left by a spring 154. It is held in the position shown during most of the time by engagement of a spring retracted latch 155 with the back of disc 120. This latch is adapted to be held by the surface of the disc in one direction of movement and spring out of the way in movement from left to right so as to clear the disc at any point in this direction of movement.

The slots 127–130 are deep enough for the latch 155 to pass through any of them when its registration with the plane of swinging movement of the operating lever permits this motion. The spring 154 is strong enough to throw the operating lever to the left when the latch 155 registers with notches in the disc, notwithstanding that this movement to the left is against the strength of spring 144.

The valve 140 is connected with cylinder 131 by passages 156 and 157 which are used intermittently as supply and exhaust passages. Upon some convenient movable member such as bar 134 I locate a resetting pin 158 whose function is to throw the operating lever to the position shown in Figures 16 and 17. The position of the parts may be indicated in any suitable way as by the indicator shown in Figure 18 which should be geared so as to turn synchronously with discs 119 and 120.

Assuming that the parts are in the position as shown in Figures 16 and 17 and that the operating lever is lifted to lift the nose 122 out of notch 121 of disc 119 and to close the circuit 159 to and through the electric motor 114, the speed reduction gearing will operate the two discs through shaft 117 at a relatively slow speed, which for normal uses will be sufficiently uniform to serve the purpose.

Starting with the parts in the positions shown and with the valve at press or machine exhaust:—

Lever 116 is lifted, closing the electric circuit and starting the controlling motor. This lifts the nose 122 out of notch 121 and rotation of the discs begins. The nose subsequently rests upon the surface 125 of the disc keeping the lever 116 up.

During the first movement the other parts will remain in the initial positions and the discs 119 and 120, will rotate in the directions indicated by the arrow heads and tails in the figures, so that notch 127, corresponding to low pressure connection, will approach the latch 155. When the notch 127 registers with the latch the spring 154 will draw the lever 151 to the left about its pivot 153, causing the latch to pass through the slot. The lever then engages pin 146 upon the reverse valve plunger rod to move the rod to the left against the compression of spring 144. This reverses the valve connections of the valve 140 so as to introduce operating fluid to the cylinder through passage 156 at the left hand end of the cylinder, and to connect passage 157 at the right hand end of the cylinder to the reversing valve exhaust. At the same time withdrawal of the end 147 of the valve bar or pilot valve shoe from engagement with the registering disc makes it unnecessary for this disc to act as a cam in forcing this shoe end 147 to the left.

When pressure is applied to the cylinder 131 at the left end the rack bar 134 is thrown to the right in Figure 17, rotating the gear in a counter-clockwise direction and carrying the valve plug and disc 139 in a counter-clockwise direction. This turns the plug to a point at which the low pressure fluid is brought into communication with the press cylinder, causing the operation of the press plunger until it comes into engagement with the die.

At the time the rack bar approaches the end of its stroke to the right in Figure 17 pin 158 upon it engages operating lever arm 151 and pushes it to the right against the tension of spring 154. This leaves the pilot shoe 145 free to move to the right and it will do so until its end comes into engagement with the exterior surface of the registering disc 139. As it is resiliently pressed against this exterior surface it will move further to the right as soon as continued rotation of the plug and registering disc to complete the rack stroke brings one of the locking openings, such as 148 into line. The pilot shoe will then spring into the next locking opening just as soon as the leading edge 150 of the opening passes the edge of the shoe end 147.

This sudden movement of the pilot shoe to the right is accompanied by a corresponding movement of the reversing valve plunger to the right which reverses the pressure connections with cylinder 131 so that the operating pressure is now applied to the right end of the cylinder through passage 157 and passage 156 at the left end of the cylinder is connected with exhaust.

The shifting of the reversing valve causes the cylinder piston to move to the left carrying with it the rack bar 134. This rotates the gear in clockwise direction and the gear tends to carry with it the ratchet disc 138 and the registering disc because the pawl 137 is secured to the gear and drags upon the surface of the ratchet disc.

By reason of this drag, movement of the valve plug in clockwise direction would be endangered but for the engagement of face 150 of the registering disc with the pilot shoe. This sets the valve exactly at each partial turn by registration with the successive faces 150.

In the counter-clockwise swinging of the operating lever the spring pressed latch member 155 rides over the surface of the disc 120 so that the parts are free to come back to the position seen in Figures 16 and 17 but with the slot 127 now beyond the latch in the direction of movement and with the end of the pilot shoe within a different locking space or recess from that shown in Figures 16 and 17. The parts remain in the position corresponding to that shown except for continued rotation of the motor armature and of discs 119 and 120 until slot 128 comes into registration with the spring latch 155 when the operating lever 151 is again drawn to the left causing another reversal of the fluid flow into and out of cylinder 131 and causing another partial turning of the plug of the valve. The same series or cycle of operations is carried through as in the previous case, with the result and effect that the valve plug is rotated in the same direction until the pilot shoe drops into another space or recess in the registering disc, causing still another reversal of the reversing valve with another resetting of the operating arm to the position seen in Figure 17.

The second turn of the operating valve is effective, with the cycle intended, to connect the machine or press with high pressure fluid supply, which is applied within the press cylinder during the heat treatment operation upon the material in the press.

There were but three positions of the valve plug or stem in the form disclosed in Figures 8 and 9, 10 and 11 and 13, respectively.

However, in the form shown in Figures 16 and 17 an additional position of the valve is provided for, seen in the valve in Figure 12, and corresponding in the valve indicated to the third quarter of valve movement. Here, though the high pressure has been cut off from the press cylinder, the latter has not been connected with exhaust and all of the passages in the valve stem or plug are cut off from the high and low pressure supplies and from the machine or press respectively.

This third or neutral position of the valve plug is provided for by a notch 129 in the disc 120, at which notch the same succession of movements of the parts takes place as before, the operating lever swinging first to the left and then to the right, the rack bar turning the valve in one direction and returning to its position in Figures 16 and 17.

A fourth notch 130 is shown in the timing disc 130, which fourth notch provides for the fourth quarter of turn of the valve in the particular form of control valve shown. In the fourth quarter turn the valve parts bring the machine or press into communication with the valve exhaust.

The weight of the switch lever 116 operating about its pivot point 126 is supported by the end 122 of lever 123, which bears upon the circumference 125 of the cycle limiting disc, so that the operator may release the lever 116 but it will not fall. This maintains the electric connection through the motor and maintains rotation of the motor throughout whatever succession of valve operations may be provided in the notching of the motor control timing and starting disc, permitting as many successive movements of the valve as there are notches in this disc or in that portion of the disc used for a cycle. However, when the disc 119 is rotated to a point where any notch 121 again registers with the end 122 of lever 123, the switch lever is no longer held up by the engagement of this end of lever 123 with the circumference of the disc and opens. At the same time the lever end 122 falls into or is pressed into the notch in the disc motor control timing and starting mechanism. Where discs 119 and 120 are rigid with each other, as illustrated, the mechanism will be stopped once for each notch appearing in disc 119.

The spacing of the several notches in disc 120 governs the time between successive movements of the valve plug.

The analogy between the two forms of my invention shown in Figures 1 and 2 and in Figures 16 and 17 respectively is quite close. Each has a controlling motor, the clock of the earlier form and the motor of the later form. Each is shown as completing a cycle in one turn of a disc or shaft and stopping at that point.

Each has timing and starting mechanism for the motor control in the device for closing the relay in the one form and the successive notches permitting lever movement in the other.

Both have motor control shown as the relay, solenoid and clutch of the one form and as operating lever, pin, and reversing valve of the other.

The valve operating motor is the running motor of the first form and the intermittently operated motor of the second.

Each has a registering device for exactly setting the valve, in the contact disc carried by the clutch shaft of the one and the registering disc carried by the valve body and preventing reverse turning of the valve in the other.

Each provides for resetting of the timing and starting motor control. In Figures 1 and 2 it is by the interruption of the electric circuit so that it will start action with renewed engagement of contacts 73 and 75 and in Figures 16 and 17 it is the pin upon the rack bar.

In order that I may show a complete operative structure, I have shown in Figures 21, 22 and 23 one mechanism by which inlet and exhaust connections may be made with cylinder 131, so as to connect either end with the inlet and the other end with the exhaust. This valve per se forms no part of my invention.

The valve 140 is provided with inlet and exhaust fluid operating connections from any suitable source, which may be, for example, the low pressure source of fluid supply for the greater part of the movement of the piston of the die press. The valve casing is provided with a bore 160 and with opposite counter-bores 161 and 162, the latter being closed by plugs 163 and 164. Plug 164 carries a stuffing box for the operating valve rod. The operating valve rod is coupled to the plunger rod 143 carrying two pistons 165 and 166, which operate within a sleeve 167 in the bore.

For purposes which will hereinafter appear, the counter-bores 161 and 162 are connected by one or more openings 168 so that fluid supply to either counter-bore can reach the other through the aperture or apertures.

The sleeve or bushing 167 is provided with openings 169 and 169' which register at all times with passages 156 and 157 extending to the rear and front ends, respectively, of the cylinder 131 and with an opening 170 connecting with inlet pipe 141. Pipe 142 connects with counter-bore 162. The pipe connections are suitably sealed.

In the position of the parts shown in Figure 21 the inlet 141 connects to the passage 156 to the rear of the cylinder through the space intermediate the pistons 165 and 166 which cylinders seal the inlet passage from the counterbore compartments 161 and 162. In the meantime the passage 157 connecting with the front of the cylinder is placed directly in communication with the counter-bore 162 and hence with the exhaust connected with it.

In the position shown in Figure 22 the pistons 165 and 166 have been moved to a neutral position where they cover both passages 156 and 157 communicating with the ends of cylinder 131.

In the position shown in Figure 23 the inlet is in communication with the passage 157 to the front end of the cylinder through the space between the pistons and connections of passage 156 with counter-bore 161 and passages 168 connect passage 156 with the exhaust through counter-bore 162.

The second form illustrated has been put in by me for the purpose merely of showing the greater breadth of my invention by another form using different operating means and is not intended to be claimed by me specifically. It will be obvious that many other forms capable of carrying out my invention may be applied with the same or other types or characters of operating means, further illustration of which would but clog the present application by increasing it to excessive length.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

I recognize not only that my invention may be applied in operating other devices than hydraulic devices and in operating by other means than through control of hydraulic connections but that when applied to hydraulic connections it is by no means limited to two-pressure valve or other connections. It would work with a valve for example which utilized more than two-pressures or with a valve controlling a single-pressure only. For convenience I have referred to a valve plug as the moving part of a valve and consequently have referred to location of the plug. I regard as an equivalent of this any other character of movement of the movable valve element as, for example, longitudinal movement of a valve plunger.

Having thus described my invention, what I claim as new and desire to secure by Letters Patent is:—

1. A two-pressure valve having high pressure, low pressure machine and exhaust connections, a continuously running valve-operating motor, an electrically controlled clutch and connections including a relay for causing the valve to be turned by the motor, an electric circuit for the relay, and time-controlled contact mechanism for successively passing a current through the relay in order to turn the valve at predetermined intervals.

2. In a valve operating mechanism, a two-pressure valve including a valve plug, means for successively turning the valve plug, operating connections therefor including a normally open electrical circuit, a time-controlled closure for the circuit starting the valve turning operation and a contact device movable with the valve for subsequently maintaining the circuit closed after opening of the time-controlled closure and operative to interrupt the circuit when the valve has reached a predetermined position.

DAVID ROBERT YARNALL.